(12) United States Patent
Hughes et al.

(10) Patent No.: US 8,972,698 B2
(45) Date of Patent: Mar. 3, 2015

(54) VECTOR CONFLICT INSTRUCTIONS

(75) Inventors: Christopher J. Hughes, Santa Clara, CA (US); Mark J. Charney, Lexington, MA (US); Yen-Kuang Chen, Cupertino, CA (US); Jesus Corbal, Barcelona (ES); Andrew T. Forsyth, Kirkland, WA (US); Milind B. Girkar, Sunnyvale, CA (US); Jonathan C. Hall, Hillsboro, OR (US); Hideki Ido, Sunnyvale, CA (US); Robert Valentine, Kiryat Tivon (IL); Jeffrey Wiedemeier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1106 days.

(21) Appl. No.: 12/976,616

(22) Filed: Dec. 22, 2010

(65) Prior Publication Data

US 2012/0166761 A1    Jun. 28, 2012

(51) Int. Cl.
  *G06F 9/30* (2006.01)
  *G06F 9/38* (2006.01)

(52) U.S. Cl.
  CPC ........ *G06F 9/30036* (2013.01); *G06F 9/30018* (2013.01); *G06F 9/30021* (2013.01); *G06F 9/30032* (2013.01); *G06F 9/3838* (2013.01)
  USPC ............................................................ 712/7

(58) Field of Classification Search
  CPC .................................................. G06F 9/30036
  USPC ............................................................. 712/7
  See application file for complete search history.

(56) References Cited

U.S. PATENT DOCUMENTS

| | | | |
|---|---|---|---|
| 7,395,419 B1 | 7/2008 | Gonion | |
| 7,617,496 B2 | 11/2009 | Gonion | |
| 7,620,797 B2 | 11/2009 | Gonion et al. | |
| 7,624,251 B2 | 11/2009 | Gonion et al. | |
| 7,728,742 B2 | 6/2010 | Gonion | |
| 7,739,442 B2 | 6/2010 | Gonion | |
| 7,800,519 B2 | 9/2010 | Gonion | |
| 8,688,957 B2 * | 4/2014 | Smelyanskiy et al. | 712/22 |
| 2008/0288744 A1 | 11/2008 | Gonion et al. | |
| 2008/0288745 A1 | 11/2008 | Gonion et al. | |
| 2008/0288754 A1 | 11/2008 | Gonion et al. | |
| 2009/0175509 A1 | 7/2009 | Gonion et al. | |
| 2009/0249026 A1 | 10/2009 | Smelyanskiy et al. | |
| 2009/0267959 A1 | 10/2009 | Gonion et al. | |
| 2010/0042789 A1 | 2/2010 | Gonion et al. | |
| 2010/0042807 A1 | 2/2010 | Gonion et al. | |
| 2010/0042815 A1 | 2/2010 | Gonion et al. | |
| 2010/0042816 A1 | 2/2010 | Gonion et al. | |

(Continued)

OTHER PUBLICATIONS

Kumar, Sanjeev, "Atomic Vector Operations on Chip Multiprocessors", 35th Annual International Symposium on Computer Architecture, 2008, pp. 441-452.

*Primary Examiner* — Andrew Caldwell
*Assistant Examiner* — Benjamin Geib
(74) *Attorney, Agent, or Firm* — Blakely, Sokoloff, Taylor & Zafman LLP

(57) ABSTRACT

A processing core implemented on a semiconductor chip is described having first execution unit logic circuitry that includes first comparison circuitry to compare each element in a first input vector against every element of a second input vector. The processing core also has second execution logic circuitry that includes second comparison circuitry to compare a first input value against every data element of an input vector.

23 Claims, 10 Drawing Sheets

(56) References Cited

U.S. PATENT DOCUMENTS

| | | |
|---|---|---|
| 2010/0042817 A1 | 2/2010 | Gonion et al. |
| 2010/0042818 A1 | 2/2010 | Gonion et al. |
| 2010/0049950 A1 | 2/2010 | Gonion et al. |
| 2010/0049951 A1 | 2/2010 | Gonion et al. |
| 2010/0058037 A1 | 3/2010 | Gonion et al. |
| 2010/0077180 A1 | 3/2010 | Gonion et al. |
| 2010/0077182 A1 | 3/2010 | Gonion et al. |
| 2010/0077183 A1 | 3/2010 | Gonion et al. |
| 2010/0079313 A1 | 4/2010 | Gonion et al. |
| 2010/0079314 A1 | 4/2010 | Gonion et al. |
| 2010/0079445 A1 | 4/2010 | Hendry et al. |
| 2010/0235586 A1 | 9/2010 | Gonion et al. |
| 2010/0325398 A1 | 12/2010 | Gonion et al. |
| 2010/0325399 A1* | 12/2010 | Gonion et al. ............ 712/222 |
| 2010/0325483 A1 | 12/2010 | Gonion et al. |
| 2011/0035567 A1 | 2/2011 | Gonion et al. |
| 2011/0035568 A1 | 2/2011 | Gonion et al. |

* cited by examiner b = 7, 2, 7, 1, 7
elements_left_mask = 1 1 1 1 1  ◄── 330
indices_having_dependency_r'ship = vconflict (b, b)  ◄── 300
indices_having_dependency_r'ship =

```
|1 0 1 0 1|0 1 0 0 0|1 0 1 0 1|0 0 0 1 0|1 0 1 0 1|  ── 301
   302       303       304       305       306
``` order_of_dependency_mask = 
```
|0 1 1 1 1|0 0 1 1 1|0 0 0 1 1|0 0 0 0 1|0 0 0 0 0|  ── 309
   314       313       312       311       310
```

308 — conflicted_out_indices ◄── vptest (indices_having_dependency_rship; order_of_dependency_mask)
— conflicted_out_indices = 1 0 1 0 0
307 — ! conflicted_out_indices = 0 1 0 1 1
331 — indices_permitted_for_execution = 0 1 0 1 1

S = gather (A[indices_permitted_for_execution])
T = vector operation on S                              } 315
scatter (T; A[indices_permitted_for_execution])

332 — elements_left_mask = conflicted_out_indices = 1 0 1 0 0

```
|1 0 1 0 1|0 1 0 0 0|1 0 1 0 1|0 0 0 1 0|1 0 1 0 1|  ── 301
```
indices_having_dependency_relationship conflicted_out_indices 308
```
|1 0 1 0 0|1 0 1 0 0|1 0 1 0 0|1 0 1 0 0|1 0 1 0 0|
``` indices_having_dependency_relationship 316 =
```
|1 0 1 0 0|0 0 0 0 0|1 0 1 0 0|0 0 0 0 0|1 0 1 0 0|
```
= vpand (indices_having_dependency_relationship; conflicted_out_indices)

317 — conflicted_out_indices = 1 0 0 0 0 ◄── vptest (indices_having_dependency_rship; order_of_dependency_mask)
318 — ! conflicted_out_indices = 0 1 1 1 1
333 — indices_permitted_for_execution = 0 0 1 0 0

FIG. 3

```
S = gather (A[indices_permitted_for_execution])
T = vector operation on S                              }  319
scatter (T; A[indices_permitted_for_execution])
```

334 —— elements_left_mask = conflicted_out_indices = 1 0 0 0 0

```
                          ┌─────┬─────┬─────┬─────┬─────┐ ← 316
                          │1 0 1 0 0│0 0 0 0 0│1 0 1 0 0│0 0 0 0 0│1 0 1 0 0│
                          └─────┴─────┴─────┴─────┴─────┘
conflicted_out_           ┌─────┬─────┬─────┬─────┬─────┐
indices 317               │1 0 0 0 0│1 0 0 0 0│1 0 0 0 0│1 0 0 0 0│1 0 0 0 0│
                          └─────┴─────┴─────┴─────┴─────┘
indices_having_                                                              vpand (indices_having_
dependency_    = ┌─────┬─────┬─────┬─────┬─────┐ =                           dependency_relationship;
relationship     │1 0 0 0 0│0 0 0 0 0│1 0 0 0 0│0 0 0 0 0│1 0 0 0 0│         conflicted_out_ indices)
320              └─────┴─────┴─────┴─────┴─────┘
```

321 —— conflict_out_indices = 0 0 0 0 0 ◄----- vptest (indices_having_dependency_
                                                          relationshipship; conflicted_out_indices)

322 —— ! conflicted_out_indices = 1 1 1 1 1
335 —— indices_permitted_for_execution = 1 0 0 0 0

```
S = gather (A[indices_permitted_for_execution])
T = vector operation on S                              }  323
scatter (T; A[indices_permitted_for_execution])
```

336 —— elements_left_mask = conflicted_out_indices = 0 0 0 0 0

VECTOR CONFLICT INSTRUCTIONS

FIELD OF INVENTION

The field of invention relates generally to the computing sciences, and, more specifically, to vector conflict instructions.

BACKGROUND

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 1A and 1B present a comparative example that demonstrates the basic difference between a scalar processor and a vector processor.

FIG. 1A shows an example of a scalar AND instruction in which a single operand set, A and B, are ANDed together to produce a singular (or "scalar") result C (i.e., AB=C). By contrast, FIG. 1B shows an example of a vector AND instruction in which two operand sets, A/B and D/E, are respectively ANDed together in parallel to simultaneously produce a vector result C, F (i.e., A.AND.B=C and D.AND.E=F).

As is well known in the art, typically, both input operands and output result are stored in dedicated registers. For example, many instructions will have two input operands. Therefore two distinct input registers will be used to temporarily store the respective input operands. Moreover, these same instructions will produce an output value which will be temporarily stored in a third (result) register. Respective input 101a,b and 102a,b and result registers 103a,b are observed in FIGS. 1A and 1B. Notably, the "scalar" vs. "vector" characterizations are readily discernable.

That is, input registers 101a and 102a of the scalar design of FIG. 1A are observed holding only scalar values (A and B, respectively). Likewise, the result register 103a of the scalar design of FIG. 1A is also observed holding only a scalar value (C). By contrast, the input registers 101b and 102b of the vector system of FIG. 1B are observed holding vectors (A,D in register 101b and B,E in register 102b). Likewise, the result register 103b of the vector system of FIG. 1B is also observed holding a vector value (C,F). As a matter of terminology, the contents of each of the registers 101b. 102b and 103b of the vector system of FIG. 1B can be globally referred to as a "vector", and, each of the individual scalar values within the vector can be referred to as an "element". Thus, for example, register 101b is observed to be storing "vector" A, D which is composed of "element" A and "element" D.

Given that vector operations correspond to the performance of multiple operations performed in parallel, a problem can arise in vector operations when one operation on an element of an input vector has a dependency on another operation performed on another element within the same input vector.

BRIEF DESCRIPTION OF THE DRAWINGS

The present invention is illustrated by way of example and not limitation in the figures of the accompanying drawings, in which like references indicate similar elements and in which:

FIG. 3 shows a pseudo code representation of an embodiment of the methodology of FIG. 2;

DETAILED DESCRIPTION

Recall from the background that a problem can rise in vector operations when one operation on an input vector element has a dependency on another operation performed on another element of the same input vector. An instance where this specific problem can arise is with the use of "gather" and "scatter" instructions.

A gather instruction, for example, helps construct an input vector for a subsequent vector operation by "gathering" data values specified by the indices of a data array. For example, if a data array "A" has 100 entries, a gather instruction of the form "gather A[15; 34; 66; 78]" will fetch the data values in the $15^{th}$, $34^{th}$, $66^{th}$ and $78^{th}$ index positions of array A. The fetched data values can then be used to form the data elements of an input vector for the vector operation. A "scatter" instruction can be viewed as the reverse of the "gather" instruction. Specifically, a scatter instruction of the form scatter A[15; 34; 66; 78] will store values (e.g., respective elements of an output vector produced by a vector operation) to the $15^{th}$, $34^{th}$, $66^{th}$ and $78^{th}$ index positions of array A.

Thus, an instruction sequence of the form
S<=gather A[a;b;c;d];
T<=vector operation on S;
scatter (A[a;b;c;d]; T)
will: 1) fetch data operands from the a, b, c and d index positions of A; 2) perform a vector operation on these operands; and, 3) store the elements of the result respectively in the a, b, c and d index positions of A. In some cases, the set of index values that are provided to the gather (and scatter) instructions reflect dependencies within the vector operation. For example, an instruction sequence of the form
S<=gather A[a;b;c;a];
T<=vector operation on S;
scatter (A[a;b;c;a]; T)
may reflect that the vector operation performed on the leftmost A[a] value has a dependency on the result of the vector operation performed on the rightmost A[a] value. That is, correct operation corresponds to: 1) operation(rightmost A[a])=>R; 2) operation(R). If precautions regarding the data dependency are not taken, an incorrect result may be obtained. Specifically, in this example, the final result for A[a] will be operation(A[a]) and not operation(R).

Figure 1A:
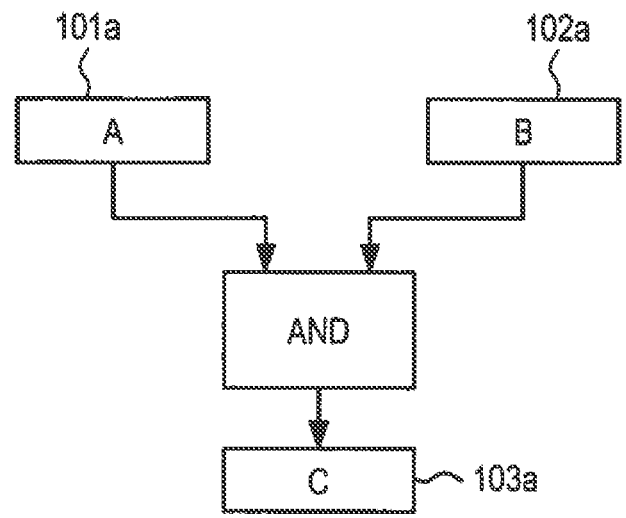
FIGS. 1a,b compare scalar v. vector processing.
Figure 1B:
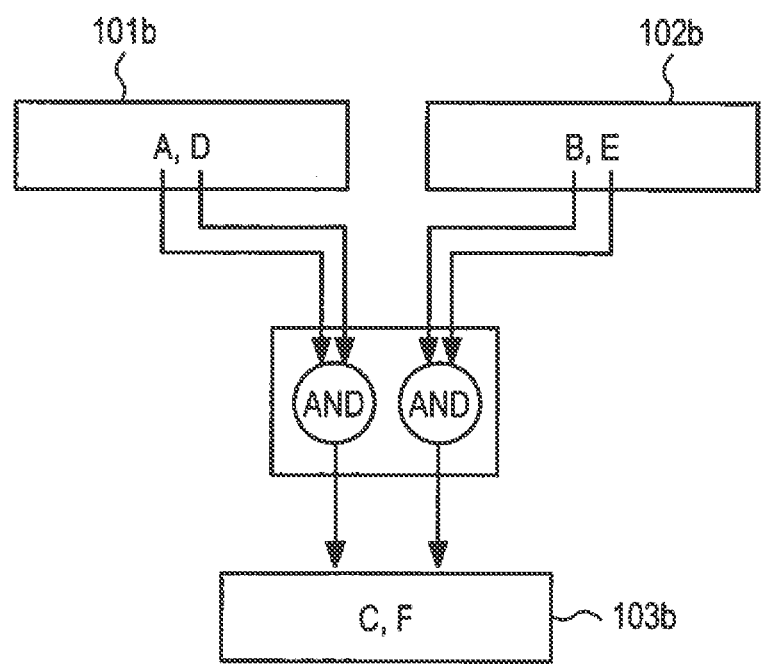
Figure 2:
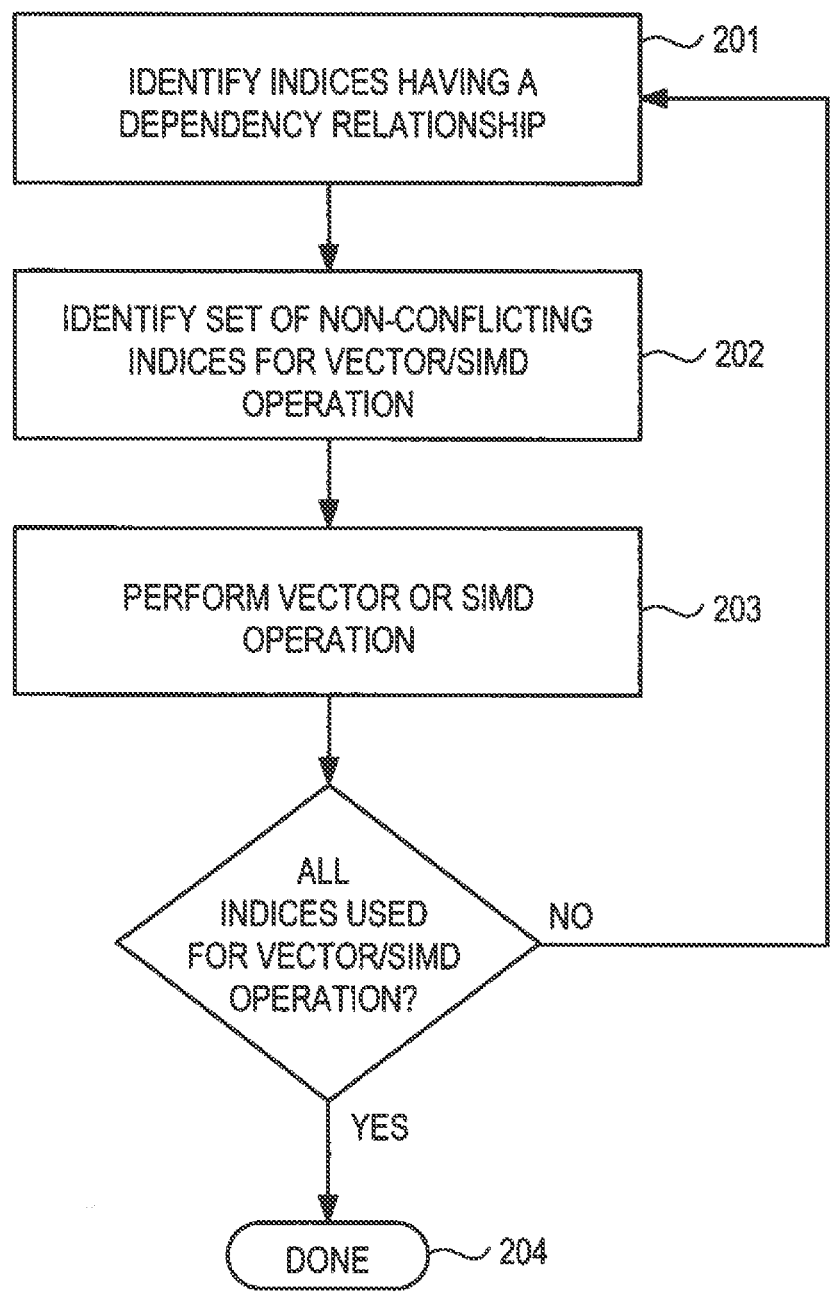
FIG. 2 shows a methodology that can be performed with instructions designed to detect vector conflicts.

FIG. 2 provides a methodology that can be used to successfully account for dependencies when dependencies are identified within an input vector for a vector operation. Specifically, the methodology of FIG. 2 will properly refrain from simultaneously performing the operation on the same operand within the same input vector (e.g., identified by at least two same valued indices). Instead, the operation will be separately performed in a sequence of cycles, where each cycle is executed for each separate instance of the index value that appears multiple times.

For instance, if the same index value appears three times for the input vector, the vector operation will be performed three times. In this manner the data dependencies are respected because the second operation uses the result of the first operation as an input operand, and, the third operation uses the result of the second operation as an input operand.

Figure 4A:
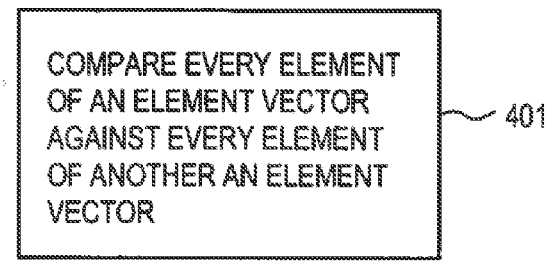
FIGS. 4a,b pertain to a first vector conflict instruction.

FIG. 3 shows a pseudo code flow of an embodiment of the methodology of FIG. 2. FIGS. 4a,b through 6a,b show additional details to assist the discussion of the pseudo code flow of FIG. 3. Referring to FIG. 2, initially, indices having a dependency relationship are identified 201. Here, indices having a dependency relationship may correspond to, as described above, same indices of an array that define different elements of a same input vector. Referring to FIG. 3, the indices of the array are specified as b=7, 2, 7, 1, 7. As such, there are three indices having a dependency relationship because the rightmost, middle and leftmost index values each have the same value (7). Another initial control vector is the elements left mask 330 which represents the elements of b that have not yet been used for a gather/vector operation/ scatter process sequence. At the start of the flow, elements_left_mask=1 1 1 1 1 which indicates all five elements of b have not yet been processed.

Figure 4B:
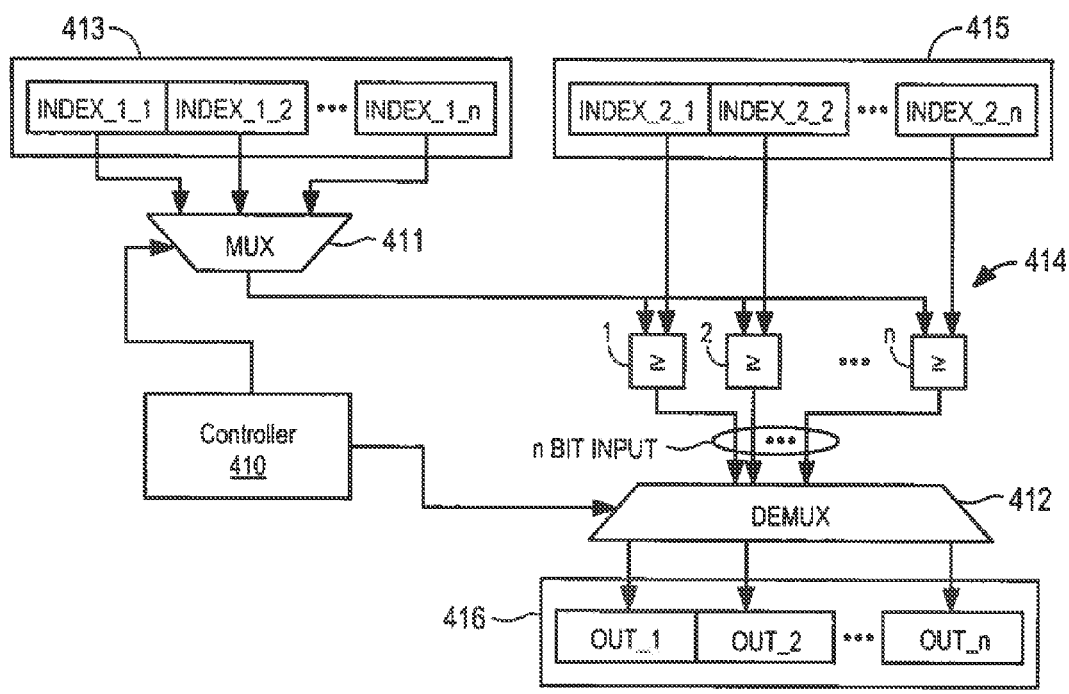

The pseudo code of FIG. 3 shows that execution of the vconflict(b, b) instruction 300 provides an indices_having_dependency_relationship data structure 301. FIG. 4a shows a methodology 401 of the vconflict(b, b) instruction and FIG. 4b shows a hardware logic design that can be designed into a semiconductor chip to perform the vconflict (b, b) instruction. As observed in FIGS. 4a and 4b, the vconflict(b,b) instruction compares each element of an input vector with every element of another input vector and provides the result of each comparison 401. In the pseudo code methodology of FIG. 3, the vconflict(b, b) instruction executes with the same vector (b) for both inputs.

The hardware design of FIG. 4b may be attempted with a micro-coded and/or state machine approach that dictates operation of controller 410 so that the respective channel selects of multiplexer 411 and de-multiplexer 412 operate in correct unison. Specifically, controller 410 multiplexes a specific one of the index values of the left index register 413 into the comparator stem 414. The comparator stem 414 compares the selected index value with every index value in the right index register 415. The de-multiplexer 412 directs the output of the comparator stem 414 to the segment of the output register 416 that is aligned with the selected value of the left index register 413. In an alternate approach, the comparator stem may have n×n comparators so that no multiplexer, de-multiplexer or controller are needed (i.e., a separate comparator exists for each bit of the comparison result presented in the output register 416).

Referring to the indices_having_dependency_relationship data structure 301 of FIG. 3, note that the left most segment 302 of data structure 301 provides the comparison results when the leftmost value of b is individually compared against every value of b. Notably, five results are presented in the segment 302 (one for each value of b), and the results within the segment 302 are respectively aligned with the values of b. As such, the leftmost segment 302 of data structure 301 is "10101" which shows that the leftmost value of b has a dependency relationship with the rightmost value of b, the middle value of b and itself (the leftmost value of b). Segment 303 of data structure 301 corresponds to the comparison of the second to leftmost value of b (2) and shows that the value of 2 has no dependency relationships in b other than itself (i.e., segment 302 is 01000). Segment 304, having a value of 10101. indicates that the middle value of b (7) has a dependency relationship with itself and the leftmost and rightmost values of b. Segment 305, having a value of 00010. indicates that the second rightmost value of b only has a dependency relationship with itself. Segment 306, having a value of 10101. indicates that the rightmost value of b (7) has a dependency relationship with the leftmost and middle values of b as well as with itself.

Returning to FIG. 2, once indices having dependency relationships have been identified (e.g., as represented in the indices_having_dependency_relationship data structure 301 of FIG. 3), a set of non conflicting indices are identified for a subsequent vector operation. In the pseudo code example of FIG. 3, the set of non conflicting indices is represented in the indices_permitted_for_execution data structure 331. Here, the indices_permitted_for_execution data structure 331 is constructed, at least in part, by performing a logical operation with the indices_having_dependency_relationship data structure 300 and an order_of_dependency_mask 309.

The order_of_dependency_mask 309 articulates the order in which indices having a dependency relationship should be processed. In the particular example of FIG. 3, dependencies are ordered right to left such that a rightmost index having a dependency relationship is used first for the vector operation, then, the next rightmost index of the dependency relationship is used for a subsequent vector operation cycle, etc. Said another way, the indices having dependency relationships are chosen for each vector operation in order from right to left across b. For the specific value of b=7, 2, 7, 1, 7 of the present example, this corresponds to the rightmost value of 7 being used for the first gather/vector operation/scatter iteration, the middle value of 7 being used for the second gather/vector operation/scatter iteration, and, the leftmost value of 7 being used for the third gather/vector operation/scatter iteration.

The order_of_dependency mask 309 reflects this order with 1s positioned "to the right" of a segment's respective position within the mask 309. That is, segment 310 represents the rightmost value of b. With the ordering rules described above (right value executed before left value in the dependency sequence), the rightmost value will not have any dependencies (even though it is involved in a dependency relationship) that delay its use for vector operation (i.e., it is executed with the first operation cycle). As such, the value of segment 310 is 00000. The second segment 311 reflects that, if the second rightmost value of b has a dependency within b, the dependency will be on the rightmost value of b. As such, its value is 00001. The third segment 312 reflects that, if the middle value of b has a dependency within b, the dependency will be on the second rightmost and/or rightmost values of b. As such, its value is 00011. The fourth segment 313 reflects that, if the second leftmost value of b has a dependency within b, it will be on the middle, second rightmost, and/or rightmost values of b. As such, its value is 00111. The fifth segment 314 reflects that, if the leftmost value of b has a dependency within b, it will be on the second leftmost, middle, second rightmost and/or rightmost values of b. As such, its value is 01111.

Recall that the indices_permitted_for_execution data structure 331 is constructed in the example of FIG. 3, at least in part, by performing a logical operation with the indices_having _dependency_relationship data structure 301 and the order_of_dependency_mask 309. Here, a conflicted_out_indices data structure 308 is constructed by executing a vptest instruction that accepts the indices_having_dependency_relationship data structure 301 and the order_of_dependency_mask 309 as inputs.

Figure 5A:
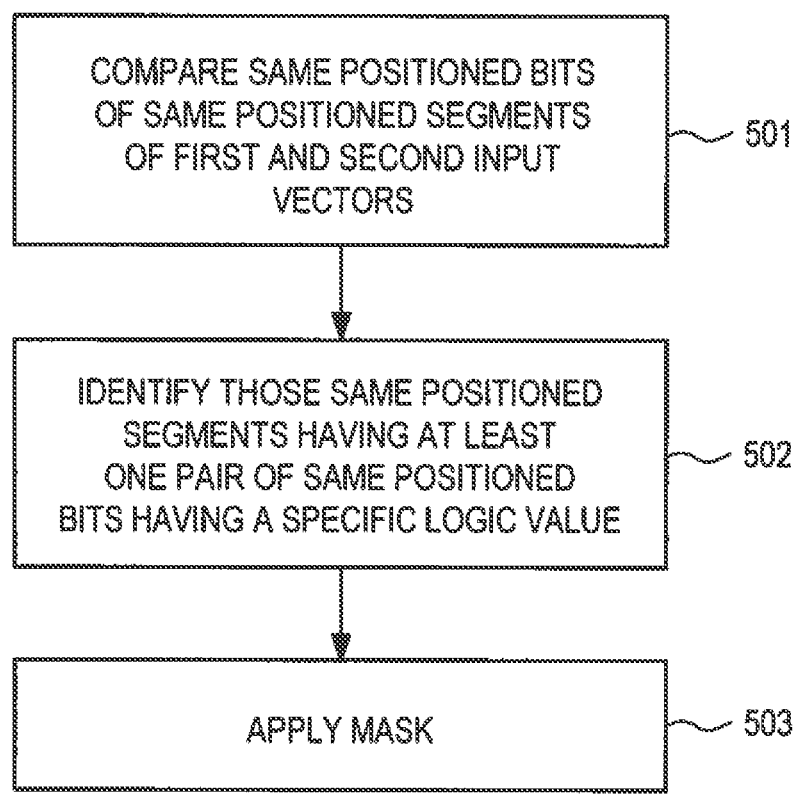
FIGS. 5a,b (prior art) pertain to a vptest instruction.
Figure 5B:
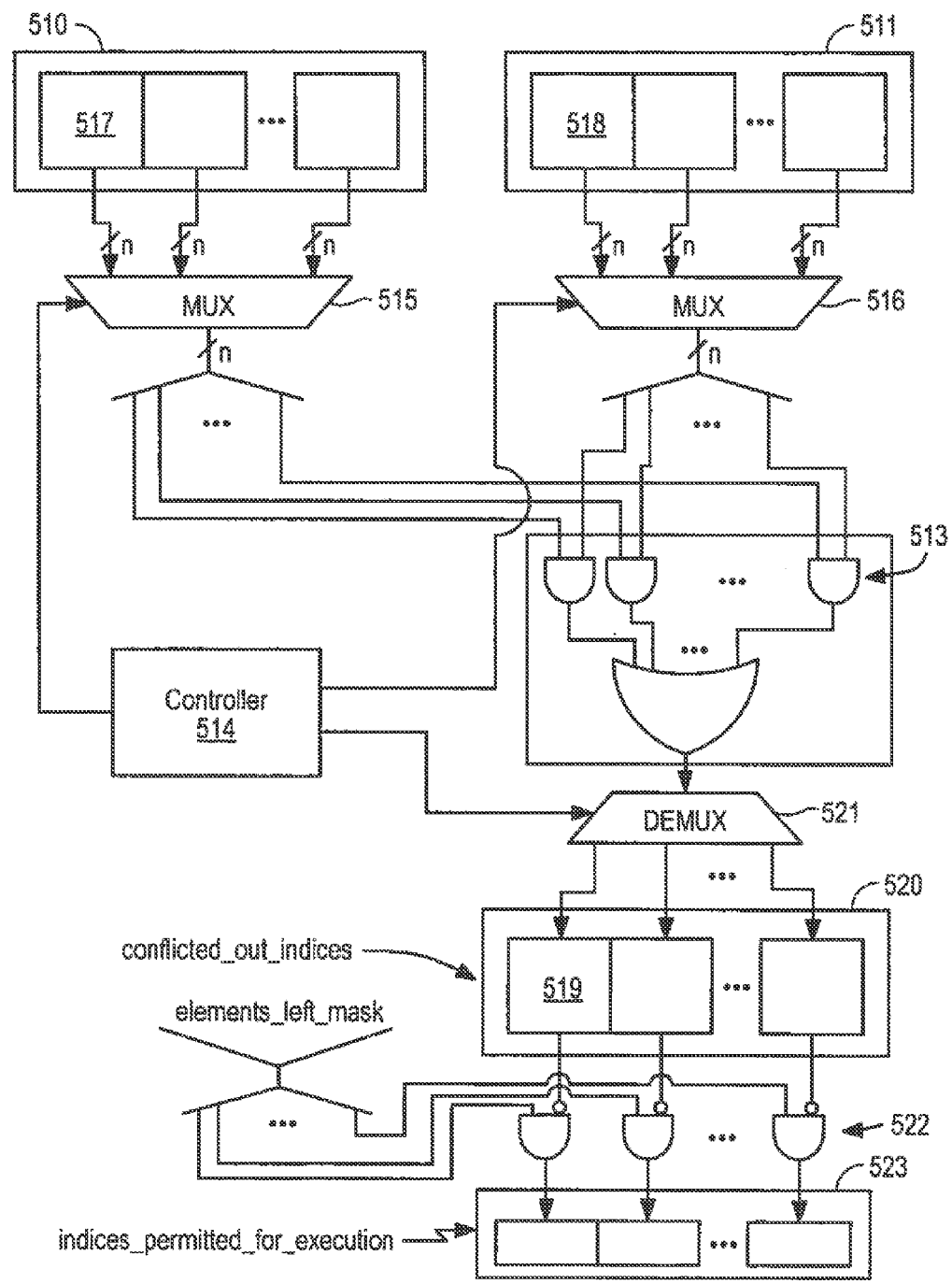

An embodiment of the operation of the vptest instruction and an embodiment of a hardware design for the vptest instruction is provided in FIGS. 5a and 5b, respectively. Here, referring to FIG. 5a, same positioned bits of same positioned segments of two input vectors are compared 501. Segments having at least one set of same positioned bits having a same logic value are identified 502, and, a mask is applied 503.

Referring to FIG. 5b, a first input vector is placed in register 510 and a second input vector is placed in register 511. Pairs of bits having the same location within their respective segments of the two vectors are ANDed with AND gates 513. If any of the AND gates produce a 1, a 1 is registered in the segment of the output 520 that corresponds to the same positioned segments whose bits were compared. For example, controller 514 will cause multiplexers 515, 516 to select the bits of segments 517 and 518. Here, each of segments 517 and 518 correspond to the leftmost segments of their respective vectors within registers 510, 511 and therefore are positioned the same within their respective vectors. Same positioned bits of segments 517 and 518 are ANDed by AND gates 513. If any pair of ANDed bits are each of value 1. then, a 1 will be recorded in segment 519 of register 520 (via controller 514 control of the channel select of demultiplexer 521). A masking layer 522 is then applied against the contents of register 520 to produce output 523.

For the specific pseudo code example of FIG. 3, the indices_having_dependency_relationship data structure 301 is placed in register 510 and the order_of_dependency_mask 309 is placed in register 511. The operation of the vptest circuit design of FIG. 5b as described above for these input vectors produces the conflicted_out_indices data structure 308 in register 520. The conflicted_out_indices data structure 308 identifies which indices are conflicted out of the upcoming vector operation cycle owing to dependencies within b. As observed in FIG. 3, the conflicted_out_indices data structure 308 has a value of 10100 which indicates that the middle and leftmost index values of b are not to be executed in the upcoming vector operation because of a dependency (which happens to be the rightmost index value of b). The logical inverse of the conflicted_out_indices data structure 314 (!_conflicted_out_indices data structure 307) is then masked against the elements_left_mask 330. In the initial iteration, the elements_left_mask is 1 1 1 1 1. As such, the conflicted_out_indices vector in register 520 is presented as the indices_permitted_for_execution vector 331 in output register 523.

Returning to FIG. 2, the vector operation is then performed 203 on the indices that are permitted for execution. The pseudo code example of FIG. 3 again refers to a gather, vector operation, scatter instruction sequence 315. As such, FIG. 3 shows: i) a gather operation that selects the values of A identified by the indices_permitted_for_execution data structure 307; ii) a vector operation being performed on the gathered values of A; and, iii) a scatter operation that stores the results of the vector operation back into the indices identified in data structure 307. The vector operation can essentially be any vector operation.

Referring to FIG. 2, if all of the indices of b have been used for the vector operation the process is complete 204, else, the indices having a dependency relationship are re-determined 201. In the embodiment of FIG. 3, the elements_left_mask is updated 332 by redefining it as the elements that were conflicted out of the most recent gather/vector operation/scatter sequence. In this case, the new elements_left_mask 332 corresponds to a value of 1 0 1 0 0 which indicates that, because the middle and leftmost values of b were not used in the last gather/vector operation/scatter sequence, they still are still "left" for processing. Hence processing is not complete and another iteration needs to be performed. The execution of the first of the index values involved in a dependency relationship (the rightmost index value) results in a change in the dependency relationship among the index values of b. Specifically, because the rightmost index value of b has been used for vector operation, vector operation with the middle index value of b no longer needs to be delayed. The indices_having_dependency_relationship data structure 301 is therefore updated to reflect this change.

Figure 6A:
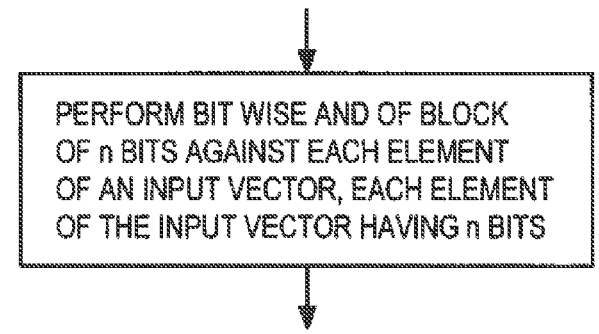
FIGS. 6a,6b pertain to a second vector conflict instruction.
Figure 6B:
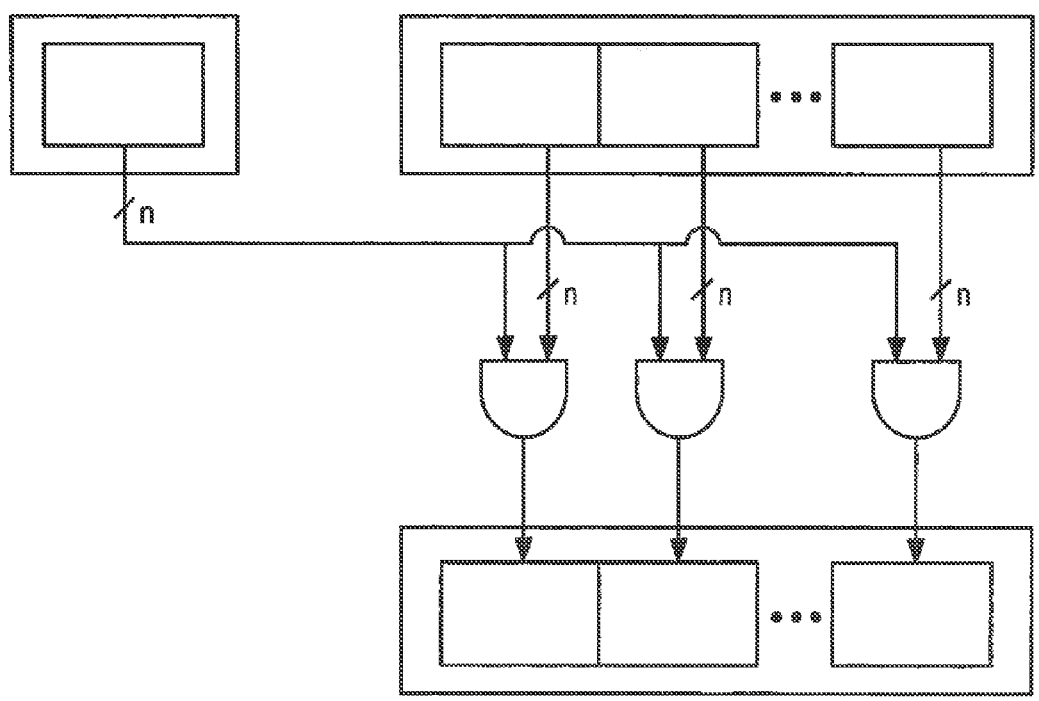

In the embodiment of FIG. 3, the indices_having_dependency_relationship data structure 301 is updated by executing a vpand instruction that accepts the indices_having_dependency_relationship data structure 300 and the conflicted_out_indices data structure 308 as inputs. An embodiment of the methodology of the vpand instruction is observed in FIG. 6a. As observed in FIG. 6a, the vpand instruction accepts a first block of n bits and a vector having multiple elements each having n bits. A bitwise AND of the first block of n bits against each element in the vector is then performed. FIG. 6b presents a possible logic design for the vpand instruction that can be designed into a semiconductor chip.

Referring to FIG. 3, the block of n bits for the vpand instruction corresponds to the conflicted_out_indices data structure 308, and, the input vector of the vpand instruction corresponds to the indices_having_dependency_relationship data structure 301. When the conflicted_out_indices data structure 308 is bitwise ANDed against each of the elements within the indices_having_dependency_relationship data structure 301, a new indices_having_dependency_relationship data structure 316 is produced. Here, the bitwise AND with the conflicted_out_indices data structure 308 has the effect of dropping the rightmost index of b from the indices_having_dependency_relationship information. Said another way, as reflected by the 0 in the rightmost location of the conflicted_out_indices data structure 308, the rightmost index value of b was permitted to be executed in the first vector operation 315. As such it is no longer part of an existing dependency relationship. The logical AND performed by the vpand instruction identifies those indices that had a dependency on the execution of the rightmost index of b-a next one of which is free to be used with the next vector operation.

As such, another execution of the vptest instruction with the new indices_having_dependency_relationship data structure 316 (and the original order_of_dependency_mask 309) produces a new conflicted_out_indices data structure 317. Unlike the initial sequence, however, the vptest instruction's output mask with the elements_left_mask 332 will cause the output of the vptest instruction to be something other than the logical inverse of the conflicted_out_indices data structure 317. Specifically, the new indices_permitted_for_execution 333 will have a value of 00100 which corresponds to the next conflicted index of b less the indexes of b that have already been executed. As such, a next gather, vector operation, scatter instruction sequence is performed 319 with only the middle index of b. Referring briefly back to FIG. 2, at this point, a second run through process 202 has just been completed.

After completion of the operation 319, however, from a check on the newly updated elements_left_mask 334, all of the indices of b have still not yet been used for the gather/vector operation/scatter process. As such, the dependency relationships amongst the indices of b still need further examination.

Like before, the indices_having_dependency_relationship data structure is updated by executing a vpand(indices_having_dependency_relationship; conflicted_out_indices) instruction with the latest indices_having_dependency_relationship and conflicted_out_indices data structures 316, 317 being used as inputs. The result is another new indices_having_dependency_relationship data structure 320. Here, the logical AND performed by the vpand instruction identifies those indices that had a dependency on the execution of the middle index of b—the next one of which (i.e., the leftmost index of b) is free to be used with the next vector operation.

As such, another execution of the vptest instruction with the new indices_having_dependency_relationship data structure 320 (and the original order_of_dependency_mask 309) produces another new conflicted_out_indices data structure 321. A mask of the updated elements_left_mask 334 against the logical inverse of data structure 321 corresponds to another new indices_permitted_for_execution data structure 335 10000. The new indices_permitted_for_execution data structure 335 indicates that only the leftmost index of b needs to be processed for the next gather/vector operation/scatter sequence. Referring briefly back to FIG. 2, at this point, a third run through process 202 has just been completed.

As such, a final gather, vector operation, scatter instruction sequence is performed 323 with only the leftmost index of b being used. With the subsequent update of the elements_left_mask 336 to a value of 00000. no other loops are required and execution is complete.

Referring to the pseudo code of FIG. 3, note that, as represented by the initial vconflict(b,b) instruction 300, this particular example is geared to a situation in which conflicts are detected in a same vector (in this case, vector b). More generally, one or more sets of indices may be used to create the input vector for a vector operation (such as the input vector for a gather/vector op instruction sequence as observed in FIG. 3). Similarly, one or more sets of indices may be used to write the output vector to memory (such as in the scatter in FIG. 3). Conflicts between indices used to construct an input vector and/or to write the output vector to memory can be detected between vectors where the vectors may be the same or different. Again, FIG. 3 demonstrates an example where the vectors are the same (b and b). In other situations, however, conflicting indices may be detected by comparing different vectors (e.g., vconflict(b,c)). For example, a first vector (e.g., b) may be used as the basis for constructing the input vector for the subsequent vector operation, while, another vector (e.g., c), may be used as the basis for scattering the results of the vector operation to memory. As such, it should be understood that the vconflict instruction can be used with same or different input vectors.

Figure 7:
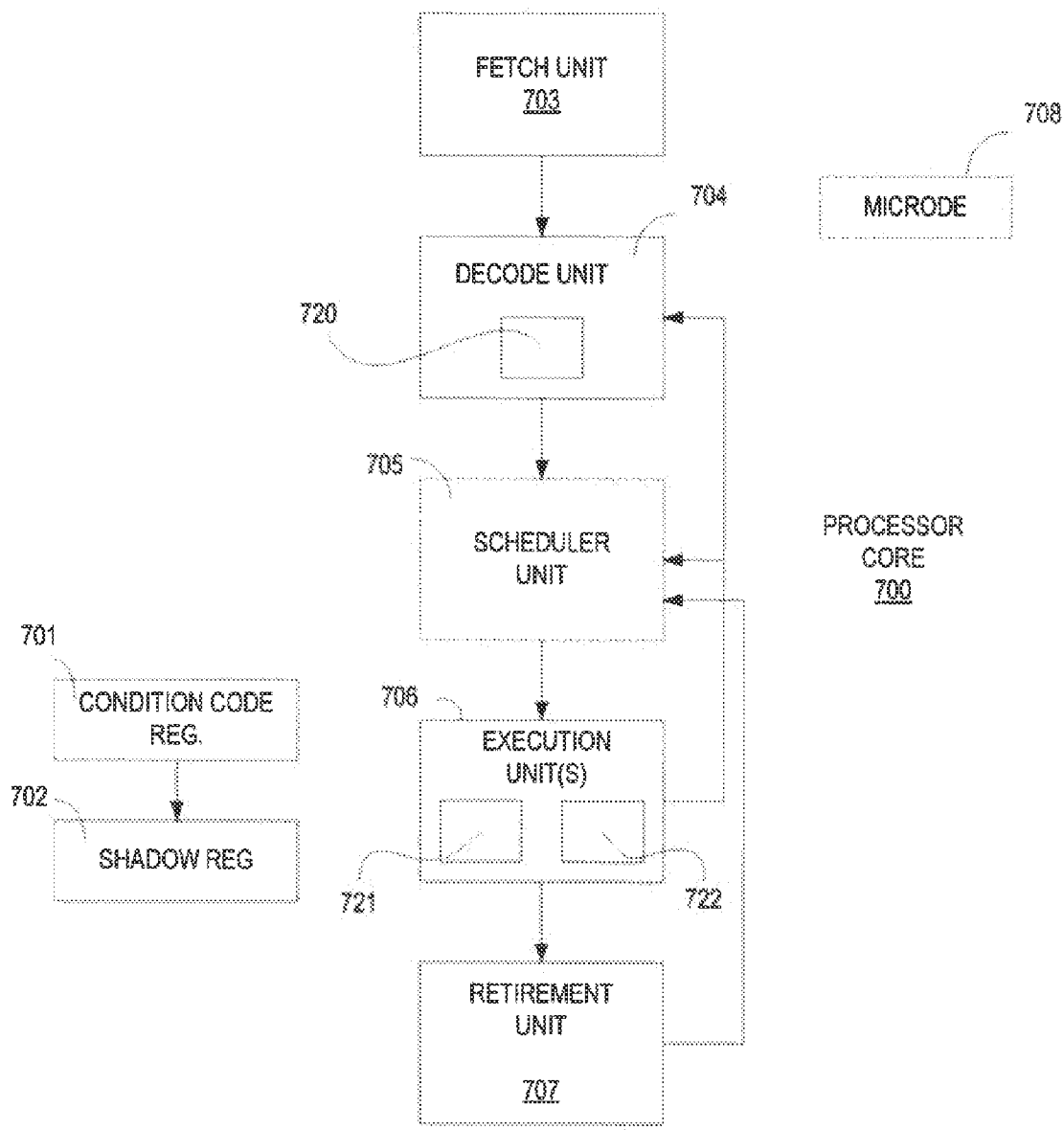
FIG. 7 shows an exemplary processing core.

FIG. 7 shows a generic processing core 700 that is believed to describe many different types of processing core architectures such as Complex Instruction Set (CISC), Reduced Instruction Set (RISC) and Very Long Instruction Word (VLIW). The generic processing core 700 of FIG. 7 includes: 1) a fetch unit 703 that fetches instructions (e.g, from cache or memory); 2) a decode unit 704 that decodes instructions; 3) a schedule unit 705 that determines the timing and/or order of instruction issuance to the execution units 706 (notably the scheduler is optional); 4) execution units 706 that execute the instructions; 5) a retirement unit 707 that signifies successful completion of an instruction. Notably, the processing core may or may not include microcode 708, partially or wholly, to control the micro operations of the execution units 706.

Notably, the execution units are capable of executing vconflict, vptest and vpand instructions. The logical circuitry to support these instructions may be dispersed across different execution units, included in a same execution unit, or, at least two of the instructions may be capable of execution from a single execution unit. The execution units also support vector instructions. The execution units may also be capable of supporting gather and scatter instructions.

Figure 8:
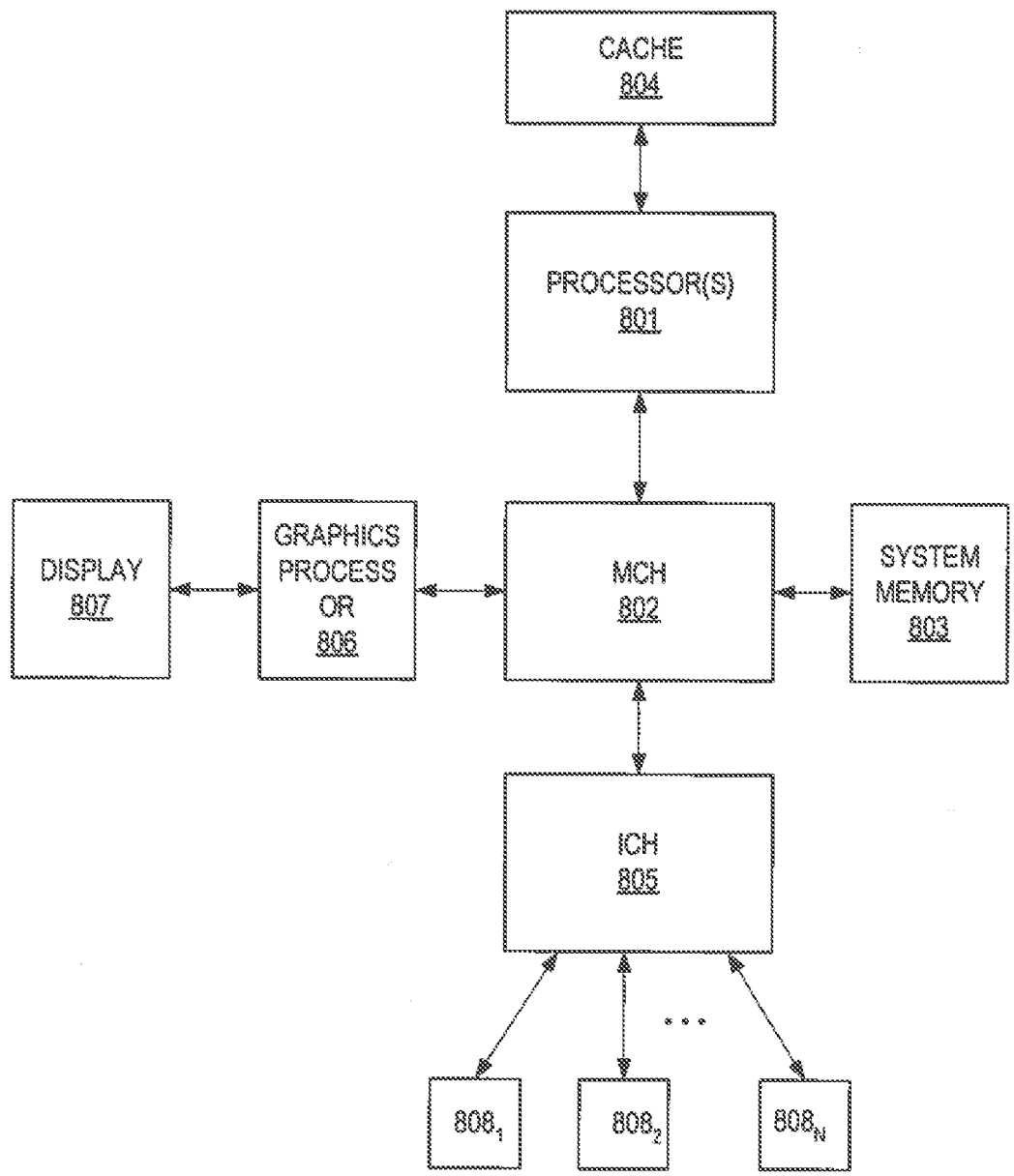
FIG. 8 shows an exemplary computing system.

A processing core having the functionality described above can be implemented into various computing systems as well. FIG. 8 shows an embodiment of a computing system (e.g., a computer). The exemplary computing system of includes: 1) one or more processing cores 801 that may be designed to include two and three register scalar integer and vector instruction execution; 2) a memory control hub (MCH) 802; 3) a system memory 803 (of which different types exist such as DDR RAM, EDO RAM, etc,); 4) a cache 804; 5) an I/O control hub (ICH) 805; 6) a graphics processor 806; 7) a display/screen 807 (of which different types exist such as Cathode Ray Tube (CRT), flat panel, Thin Film Transistor (TFT), Liquid Crystal Display (LCD), DPL, etc.) one or more I/O devices 808.

The one or more processing cores 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2. Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processing core implemented on a semiconductor chip, comprising:
   comparison circuitry to compare each element in a first input vector against every element of a second input vector to identify elements having a dependency relationship; and
   logic circuitry to generate a data structure having a plurality of segments, wherein each segment is to store values of the dependency relationship of a corresponding element in the first input vector compared against every element of the second input vector.

2. The processing core of claim 1 wherein the first input vector and the second input vector are the same.

3. The processing core of claim 2 further comprising vector execution units to perform vector operation instructions.

4. The processing core of claim 3 further comprising gather execution unit logic circuitry to perform a gather instruction.

5. The processing core of claim 4 further comprising scatter execution logic circuitry to perform a scatter instruction.

6. The processing core of claim 1 wherein said elements comprise indices.

7. A computing system, comprising:
   a storage element; and
   a processing core comprising:
      comparison circuitry to compare each element in a first input vector against every element of a second input vector to identify elements having a dependency relationship; and
      logic circuitry to generate a data structure having a plurality of segments, wherein each segment is to store values of the dependency relationships of a corresponding element in the first input vector compared against every element of the second input vector.

8. The computing system of claim 7 wherein the first input vector and the second input vector are the same.

9. A method, comprising:
   performing the following with electronic circuitry on a semiconductor chip:
      a) generating a first data structure having a plurality of segments that identities dependencies within data operations to be performed on data elements within an input vector of a vector operation, wherein each segment is to store values of the dependencies of a corresponding data element of the input vector compared against the other data elements of the input vector;
      b) generating a second data structure that identifies data element locations of said input vector to be concurrently operated on by the vector operation without creating data conflicts, said second data structure created at least in part by masking the first data structure with a data structure that indicates an order of execution for data operations having dependencies;
      c) forming a next input vector with data elements referenced by said second data structure; and
      d) performing said vector operation on said next input vector.

10. The method of claim 9 wherein:
    a) is initially performed by comparing each index in a set of indices for said input vector's data elements against other indices of a second set of indices.

11. The method of claim 10 wherein said set and said second set are the same.

12. The method of claim 10 wherein said set and said second set are different.

13. The method of claim 10 wherein:
    subsequent iterations of a) are performed by masking a just completed iteration's first data structure against a third data structure that identifies indices for those of said data element locations whose corresponding operations have been delayed because of data dependencies.

14. The method of claim 13 wherein said comparing is performed with a first processing core instruction and said masking of said just completed iteration's first data structure against said third data structure is performed with a second processing core instruction.

15. The method of claim 14 wherein b) is performed with a third processing core instruction.

16. The method of claim 9 wherein said forming of said next input vector further comprises executing a gather instruction with said second data structure.

17. The method of claim 16 further comprising executing a scatter instruction with said second data structure after said vector operation is performed on said next input vector.

18. A processing core on a semiconductor chip, comprising:
   a) first logic circuitry to generate a first data structure having a plurality of segments that identities dependencies within data operations to be performed on data elements within an input vector of a vector operation, wherein each segment is to store values of the dependencies of a corresponding data element of the input vector compared against the other data elements of the input vector;
   b) second logic circuitry to generate a second data structure that identifies data element locations of said input vector to be concurrently operated on by the vector operation without creating data conflicts, said second logic circuitry having masking circuitry to mask the first data structure with a data structure that indicates an order of execution for data operations having dependencies;
   c) a vector execution unit to execute the vector operation on a next input vector formed with data elements referenced by said second data structure; and
   d) third logic circuitry to update said first data structure on iterations of a control flow that loops b) and c) in sequence until said vector operation has been performed on all data element locations of said input vector, wherein said second logic circuitry to also update said second data structure on said iterations.

19. The processing core of claim 18 wherein:
said first logic circuitry comprises comparison circuitry to compare each index in a set of indices for said input vector's data elements against other indices of a second set of indices.

20. The processing core of claim 19 wherein:
said third logic circuitry comprises masking circuitry to mask a just completed iteration's first data structure against a third data structure that identifies indices for those of said data element locations whose corresponding operations have been delayed because of data dependencies.

21. The processing core of claim 20 wherein:
said first logic circuitry is within an execution unit of a first instruction of said processing core, said second logic circuitry is within an execution unit of a second instruction of said processing core and said third logic circuitry is within a third execution unit of a third instruction of said processing core.

22. The processing core of claim 18 further comprising an execution unit to execute a gather instruction to be used with said second data structure to form said next input vector.

23. The processing core of claim 22 further comprising an execution unit to execute a scatter instruction.

* * * * *

UNITED STATES PATENT AND TRADEMARK OFFICE
CERTIFICATE OF CORRECTION

| | | Page 1 of 1 |
|---|---|---|
| PATENT NO. | : 8,972,698 B2 | |
| APPLICATION NO. | : 12/976616 | |
| DATED | : March 3, 2015 | |
| INVENTOR(S) | : Hughes et al. | |

It is certified that error appears in the above-identified patent and that said Letters Patent is hereby corrected as shown below:

In the Claims

In column 10, at line 21 delete "identities" and insert --identifies--

In column 11, at line 4 delete "identities" and insert --identifies--

Signed and Sealed this
Nineteenth Day of January, 2016

Michelle K. Lee
*Director of the United States Patent and Trademark Office*